3,349,130
NOVEL PROCESS FOR THE PREPARATION OF
2-ALKYL-CYCLOPENTANE-1,3-DIONES
Robert Bucourt, Clichy-sous-Bois, André Pierdet, Noisy-le-Sec, Germain Costerousse, Montrouge, Seine, Robert Joly, Montmorency, Julien Warnant, Neuilly-sur-Seine, and Bernard Goffinet, Paris, France, assignors to Roussel-UCLAF, Paris, France, a corporation of France
No Drawing. Filed Apr. 22, 1964, Ser. No. 361,887
Claims priority, application France, Apr. 26, 1963, 932,866; Feb. 17, 1964, 964,020
14 Claims. (Cl. 260—586)

The invention relates to a novel process for the preparation of 2-alkyl cyclopentane-1,3-diones of the formula

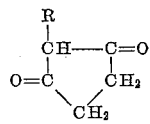

wherein R is a lower alkyl radical having 1 to 7 carbon atoms.

In copending, commonly assigned United States application Ser. No. 361,877, filed Apr. 22, 1964, the preparation of 2-lower alkyl-cyclopentane-1,3-diones starting from the corresponding alkyl acyl succinate is described. The said alkyl acyl succinate is cyclized to 1,3-dioxo-4-carb-lower-alkoxy-2-lower alkyl - cyclopentane-1,3-dione which is saponified and decarboxylated to obtain the desired 2-alkyl-cyclopentane-1,3-dione.

Le Peletier De Rosanbo (Ann. Chim., vol. 19, 1923 [9], p. 327) and Eskola (Ann. Acad. Sci. Fennicae, 1946, A II, pp. 1 to 27 or Chem. Abs., 1947, p. 949) stated that it is possible to obtain a cyclopentane structure starting from certain substituted derivatives of esters of 5-methyl-levulinic acid, particularly if the substitution favors enolization between the 4 and 5 carbon atoms such as in methyl-2,5-diphenyl-levulinate and methyl-3,3,5-trimethyl-levulinate. According to Eskola, the cyclization into β-diketo cyclic derivatives was effected with higher yields when the starting γ-keto esters had more and larger substituents in the α, β and δ positions, and if the substituents in the δ-position were strongly polarizing.

It is therefore surprising that lower alkyl esters of 5-lower alkyl-levulinic acids, which contain no substituents at the α- and β-positions, can be cyclised fairly readily under certain conditions.

It is an object of the present invention to provide a novel process for the preparation of 2-lower alkyl-cyclopentane-1,3-diones.

It is a further object of the invention to provide a novel process for the cyclization of esters of δ-lower alkyl-levulinic acids.

These and other objects and advantages of the invention will become obvious from the following detailed description.

The novel process of the invention for the preparation of 2-lower alkyl-cyclopentane-1,3-diones comprises cyclizing a lower alkyl ester of 5-lower alkyl-levulinic acid in the presence of an alkali metal tertiary alcoholate in an aprotic solvent to obtain the corresponding 2-lower alkyl-cyclopentane-1,3-dione.

Examples of suitable alkali metal tertiary alcoholates are sodium or potassium tert.-butylate or tert.-amylate as well as other tertiary lower alkyl alcoholates.

Examples of suitable aprotic solvents are benzenic hydrocarbons such as benzene, toluene, xylene, etc., and ether-oxides such as isopropyl ether, methyl ether, etc.

The 2-alkyl-cyclopentane-1,3-diones are useful as starting materials for the preparation of steroids having a lower alkyl radical in the 13-position such as estradiol, 19-nor-testosterone, 13-ethyl-18-nor-estradiol, 13-n-propyl-18-nor-estradiol, 13 - propyl-18,19-di-nor-testosterone and derivatives substituted in the 17-position.

The lower alkyl esters of 5-methyl-levulinic acid are easily obtained by condensation of ethyl succinyl chloride with ethyl zinc iodide (Mueller et al., Monatshefte, vol. 58, 1931, p. 24) or by decarboxylation of ethyl propionyl succinate (Friedmann, J. für Praktische Chemie, vol. 146, 1936, p. 159) followed by esterification of the free acid with lower alkanol.

The lower alkyl esters of other 5-lower alkyl-levulinic acids can be prepared by condensing a lower alkyl aldehyde with ethyl maleate, hydrolyzing and decarboxylating the condensation product with a strong mineral acid to form the corresponding 5-lower alkyl-levulinic acid which can be esterified with a lower alkanol to form the desired ester.

In the following examples there are described several preferred embodiments to illustrate the invention. However, it should be understood that the invention is not intended to be limited to the specific embodiments.

EXAMPLE I

*Preparation of 2-methyl-cyclopentane-1,3-dione*

80 cc. of xylene were added to 25 cc. of a solution of 0.92 N potassium t-butylate in t-butanol and the said mixture was heated to reflux and 30 cc. of xylene were distilled therefrom. Then 1.58 gm. of anhydrous ethyl-5-methyl-levulinate was introduced dropwise over a half-hour period and the distillation was continued at a temperature of 140° C. for four hours under an atmosphere of nitrogen. About 20 cc. of xylene were distilled off which was replaced by an equal amount of xylene.

The said mixture was then cooled to 0° C. and water was added thereto. The aqueous phase was decanted and the xylene phase was extracted with water. The aqueous fractions were combined, acidified to a pH of 2 with dilute hydrochloric acid and concentrated to dryness under vacuum. The residue obtained was sublimed by heating under vacuum (1 mm. Hg) at about 200° C. for 20 minutes to obtain 870 mg. of 2-methyl-cyclopentane-1,3-dione having a melting point of 214° C. and in the form of white needles. The product was identical with the same product obtained by other means.

EXAMPLE II

*Preparation of 2-ethyl-cyclopentane-1,3-dione*

STEP A.—PREPARATION OF ETHYL BUTYRYL SUCCINATE 728 gm. of butyraldehyde and 500 gm. of ethyl maleate were added to 100 gm. of benzoyl peroxide and the resulting solution was heated under agitation for 24 hours at about 55 to 60° C. Then the excess butyraldehyde was distilled off to obtain an ethyl butyryl succinate which was used in the next step.

STEP B.—PREPARATION OF 5-ETHYL-LEVULINIC ACID 1000 cc. of hydrochloric acid diluted in half were added to the ethyl butyryl succinate formed in Step A with agitation. The mixture was then distilled by progressively raising the temperature over a period of 2 hours up to 107° C. to obtain 5-ethyl-levulinic acid which was used as such in the next step.

STEP C.—PREPARATION OF BUTYL-5-ETHYL-LEVULINATE 600 cc. of n-butanol and 3 cc. of sulfuric acid were added to the 5-ethyl-levulinic acid obtained in Step B and the water of reaction was removed by azeotropic distillation. After 200 cc. of dichloroethane were added to the resulting solution, the solution was placed in a separating funnel and was washed with a saturated solution of sodium bicarbonate. The organic phase was dried and distilled under vacuum over a water bath. The resulting product was distilled under vacuum to obtain butyl 5-ethyl-levulinate having a boiling point of 107–108° C. at 4 mm. Hg and the said product was used as such for the next step.

STEP D.—PREPARATION OF 2-ETHYL-CYCLOPENTANE-1,3-DIONE 314 gm. of sodium t-butylate were dissolved in 1000 cc. of boiling toluene and the resulting solution was distilled to eliminate t-butanol while maintaining a constant volume by adding toluene. 200 gm. of butyl-5-ethyl-levulinate were added to the resulting solution over a period of 40 minutes after which the distillation was continued until the vapor temperature was 108° C. Then, 700 cc. of water were slowly added to eliminate the toluene by azeotropic distillation. The aqueous solution was then cooled, passed over carbon black, air dried, washed and acidified to a pH of 2 by the addition of 250 cc. of hydrochloric acid. The resulting solution was allowed to stand for one hour at 10° C. The resulting solution was again air dried, washed, poured into ice water and dried. The precipitated product was recrystallized from methyl ethyl ketone to obtain 79.5 gm. of 2-ethyl-cyclopentane-1,3-dione having a melting point of 175° C.

The product occurred in the form of thin plates insoluble in ether and benzene, slightly soluble in water and soluble in alcohol and acetone.

Analysis.—$C_7H_{10}O_2$; molecular weight=126.15—calculated: C, 66.64%; H, 7.99%. Found: C, 66.7%; H, 8.1%.

EXAMPLE III

Preparation of 2-propyl-cyclopentane-1,3-dione

STEP A.—PREPARATION OF ETHYL n-VALERYL SUCCINATE 214 gm. of n-valeraldehyde and 100 gm. of ethyl maleate were added to 3 gm. of benzoyl peroxide and the resulting solution was heated at about 55 to 60° C. for 20 hours with agitation. The excess n-valeraldehyde and ethyl maleate were distilled to obtain a residue of ethyl n-valeryl succinate.

STEP B.—PREPARATION OF 5-n-PROPYL-LEVULINIC ACID 1000 cc. of hydrochloric acid diluted in half were added to the ethyl n-valeryl succinate obtained in Step A and the resulting mixture was heated to reflux over a period of 15 hours. The said mixture was then concentrated to obtain 5-n-propyl-levulinic acid in the form of an oil.

STEP C.—PREPARATION OF BUTYL 5-n-PROPYL LEVULINATE 200 cc. of n-butanol and 1 cc. of sulfuric acid were added to the 5-n-propyl-levulinic acid obtained in Step B and the water of reaction was removed by azeotropic distillation. The oily residue obtained was distilled at 132° C. at 5 mm. Hg to obtain 82 gm. of butyl-5-n-propyl-levulinate which was used as such for the next step.

STEP D.—PREPARATION OF 2-n-PROPYL-CYCLOPENTANE-1,3-DIONE 111 gm. of sodium tert.-butylate were dissolved in 400 cc. of boiling toluene and the tert.-butanol was distilled off while maintaining the volume constant by the addition of toluene. Then 78 gm. of butyl-5-n-propyl-levulinate were introduced over a half hour after which the distillation was continued until the vapors reached a temperature of 108° C. 260 cc. of water were slowly added then and the toluene was removed by azeotropic distillation. The said mixture was cooled with agitation over 10 minutes, treated with carbon black, washed with water, acidified to a pH of 2 by the addition of 98 cc. of hydrochloric acid and then subjected to agitation at 0° C. for 1 hour. The mixture was air dried, washed with water and again dried to obtain a product which after recrystallization from acetone gave 32 gm. of 2-n-propyl-cyclopentane-1,3-dione having a melting point of 180° C.

The product occurred in the form of thin, colorless plates slightly soluble in water and many of the common organic solvents.

Analysis.—$C_8H_{12}O_2$; molecular weight=140.18—calculated: C, 68.54%; H, 8.63%. Found: C, 68.6%; H, 8.6%.

EXAMPLE IV

Preparation of 2-isopropyl-cyclopentane-1,3-dione

STEP A.—PREPARATION OF ETHYL-ISOVALERYL SUCCINATE 5 gm. of benzoyl peroxide were added to 249 gm. of isovaleraldehyde and 167 gm. of ethyl maleate and the resulting solution was heated at about 60 to 65° C. under agitation for a period of 24 hours. Then, excess isovaleraldehyde and ethyl maleate were distilled off to obtain a residue of ethyl isovaleryl succinate.

STEP B.—PREPARATION OF 5-ISOPROPYL-LEVULINIC ACID 1100 cc. of hydrochloric acid diluted in half were added to the ethyl isovaleryl succinate formed in Step A and the resulting mixture was heated to reflux for a period of 15 hours and was then concentrated to obtain 5-isopropyl-levulinic acid.

STEP C.—PREPARATION OF BUTYL 5-ISOPROPYL-LEVULINATE 300 cc. of n-butanol and 1.2 cc. of sulfuric acid were added to the 5-isopropyl-levulinic acid prepared in Step B and the water of reaction was removed by azeotropic distillation. After the excess n-butanol was removed by distillation, the oily residue was distilled at 115° C. at 5 mm. Hg to obtain 110 gm. of butyl 5-isopropyl-levulinate.

STEP D.—PREPARATION OF 2-ISOPROPYL-CYCLOPENTANE-1,3-DIONE

Using the procedure of Step D of Example III, the butyl 5-isopropyl-levulinate of Step C was reacted with sodium tert.-butylate in toluene to obtain 2-isopropyl-cyclopentane-1,3-dione having a melting point of 214° C.

The product was colorless and was slightly soluble in water and most common organic solvents.

Analysis.—$C_8H_{12}O_2$; molecular weight=140.18—calculated: C, 68.54%; H, 8.63%. Found: C, 68.6%; H, 8.6%.

Various modifications of the process of the invention may be without departing from the spirit or scope thereof and it is to be understood that the invention is intended to be limited only as defined in the appended claims.

We claim:

1. A process for the preparation of 2-lower alkyl-cyclopentane-1,3-diones of the formula

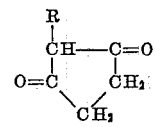

wherein R is lower alkyl which comprises cyclizing a lower alkyl ester of 5-lower alkyl-levulinic acid in the presence of an alkali metal tertiary alcoholate at about reflux temperatures in an aprotic solvent selected from the group consisting of benzene hydrocarbons and lower alkyl ethers to form the corresponding 2-lower alkyl-cyclopentane-1,3-dione.

2. The process of claim 1 wherein R is methyl.
3. The process of claim 1 wherein R is ethyl.
4. The process of claim 1 wherein R is n-propyl.
5. The process of claim 1 wherein R is isopropyl.
6. The process of claim 1 wherein the alkali metal tertiary alcoholate is selected from the group consisting of sodium and potassium tert.-butylate and tert.-amylate.
7. A process for the preparation of 2-methyl-cyclopentane-1,3-dione which comprises cyclizing a lower alkyl ester of 5-methyl-levulinic acid in the presence of potassium tert.-butylate at about reflux temperatures in xylene to form 2-methyl-cyclopentane-1,3-dione.

8. The process of claim 7 wherein the said lower alkyl ester is the ethyl ester.

9. A process for the preparation of 2-ethyl-cyclopentane-1,3-dione which comprises cyclizing a lower alkyl ester of 5-ethyl-levulinic acid in the presence of sodium tert.-butylate at about reflux temperatures in toluene to form 2-ethyl-cyclopentane-1,3-dione.

10. The process of claim 9 wherein the said lower alkyl ester is the butyl ester.

11. A process for the preparation of 2-n-propyl-cyclopentane-1,3-dione which comprises cyclizing a lower alkyl ester of 5-n-propyl levulinic acid in the presence of sodium tert.-butylate at about reflux temperatures in toluene to form 5-n-propyl-cyclopentane-1,3-dione.

12. The process of claim 11 wherein the said lower alkyl ester is the butyl ester.

13. A process for the preparation of 2-isopropyl-cyclopentane-1,3-dione which comprises cyclizing a lower alkyl ester of 5-isopropyl-levulinic acid in the presence of sodium tert.-butylate at about reflux temperatures in toluene to form 2-isopropyl-cyclopentane-1,3-dione.

14. The process of claim 13 wherein the said lower alkyl ester is the butyl ester.

References Cited

Adams et al., "Organic Reactions," vol. VI, pp. 3, 4 and 38.

Elliot, "J. Chem. Soc.," pp. 2231, 2236 and 2237 (1956).

Eskola, "Chem. Abstract," vol. 32, col. 3359 (1938).

Le Peletier De Rosanbo, Ann. Chim, vol. 19 (Ser. 9), pp. 327 to 330, 342, 343, and 355.

Morris et al., "Organic Chemistry," p. 454 (1959).

LEON ZITVER, *Primary Examiner.*

M. JACOB, *Assistant Examiner.*